United States Patent
Dewey et al.

(10) Patent No.: US 9,300,677 B2
(45) Date of Patent: Mar. 29, 2016

(54) DATA SECURITY SYSTEM

(75) Inventors: David B. Dewey, Alpharetta, GA (US); Darrell O. Swope, Norcross, GA (US)

(73) Assignee: International Business Machines Corporation, Armonk, NY (US)

(*) Notice: Subject to any disclaimer, the term of this patent is extended or adjusted under 35 U.S.C. 154(b) by 1132 days.

(21) Appl. No.: 12/903,495

(22) Filed: Oct. 13, 2010

(65) Prior Publication Data

US 2012/0096536 A1   Apr. 19, 2012

(51) Int. Cl.
*H04L 29/00* (2006.01)
*H04L 29/06* (2006.01)
*G06F 21/57* (2013.01)

(52) U.S. Cl.
CPC ............ *H04L 63/123* (2013.01); *G06F 21/577* (2013.01); *H04L 63/0227* (2013.01)

(58) Field of Classification Search
USPC ..................................... 726/11, 23
See application file for complete search history.

(56) References Cited

U.S. PATENT DOCUMENTS 7,512,981 B2 * 3/2009 Pearson ........................ 726/23
2006/0282897 A1 12/2006 Sima et al.
2007/0016960 A1 1/2007 Glaser et al.
2008/0256612 A1 10/2008 Roy et al.
2009/0100518 A1 4/2009 Overcash

OTHER PUBLICATIONS

Lin et al., "An Automatic Meta-revised Mechanism for Anti-malicious Injection", NBis 2007, LNCS 4658, pp. 98-107, 2007, Springer-Verlag Berlin Heidelberg 2007.
Higgins, "Kaminsky Issues Developer Tool to Kill Injection Bugs," UBM TechWeb, Jun. 4, 2010, 4 pages. Accessed Aug. 17, 2010, http://www.darkreading.com/database_security/security/app-security/showArticle.jhtml?articleID=225700088.

* cited by examiner

*Primary Examiner* — Brandon Hoffman
*Assistant Examiner* — Michael D Anderson
(74) *Attorney, Agent, or Firm* — Yee & Associates, P.C.; Lisa Ulrich

(57) ABSTRACT

A method, computer system, and computer program product for validating data contained in a request sent by a requestor to a server application. A computer receives the request from the requestor before receipt of the request by the server application. The computer identifies a set of data validation rules to apply to the data in the request based on a data format specification contained in the request sent by the requestor. The computer determines whether the data is valid based on the identified set of data validation rules. The computer forwards the request to the server application in response to the computer determining that the data is valid based on the identified set of data validation rules.

20 Claims, 7 Drawing Sheets

DATA SECURITY SYSTEM

BACKGROUND

1. Field

The present invention relates generally to security for a server application, and more particularly, to a technique to validate a request for the server application.

2. Description of the Related Art

The Internet is a set of computer networks that are joined together by components, such as gateways, to handle the transfer and conversion of messages from the protocol that is used by the sending network to the protocol used by the receiving network. The Internet carries information and is used to provide services. The information and services include, for example, without limitation, electronic mail, online chat services, file transfers, web pages, and other resources.

The Internet is commonly used as a source of information and entertainment. Further, the Internet is also used as a medium for business activities. Many businesses, government entities, and other organizations have a presence on the Internet using websites to perform various transactions.

Many businesses, government entities, and other organizations have a presence on the internet using websites to perform various transactions. Organizations may offer goods and services. These goods and services may involve a sale of goods that is to be shipped to a customer. The goods also may be software and/or data purchased by a customer and transferred over the Internet to the customer.

In performing transactions and looking for information, customers and other users utilize programs, such as browsers, to interact with websites. For example, a user at a computer may enter information into a form on a webpage displayed by the browser on the computer. The user may then submit the information to an application. This application is a server application and, more specifically, may be referred to as a web server application.

With the transfer of information from users to server applications, security is a concern. One concern is the confidentiality of information being transferred from the browser to the server application. Encryption and other mechanisms are currently used to provide this type of security.

An example of another type of security concern is vulnerabilities of the web server application. Vulnerabilities of web server applications are a large class of vulnerabilities that occur on a regular basis. Many of the vulnerabilities in web server applications result from an improper validation of data sent to the web server applications.

For example, currently available web server applications often do not perform validation of data passed to them by a client. For example, the data may not give the correct type and length. When these situations occur, the server application attempts to handle the data, even though the data is of the wrong type or length. As a result, vulnerabilities may occur with this type of situation.

SUMMARY

The different illustrative embodiments provide a method, computer system, and a computer program product for validating data contained in a request sent by a requestor to a server application. A computer receives the request from the requestor before receipt of the request by the server application. The computer identifies a set of data validation rules to apply to the data in the request based on a data format specification contained in the request sent by the requestor. The computer determines whether the data is valid based on the identified set of data validation rules. The computer forwards the request to the server application in response to the computer determining that the data is valid based on the identified set of data validation rules.

BRIEF DESCRIPTION OF THE SEVERAL VIEWS OF THE DRAWINGS

FIG. 6 is an illustration of a table of names for a parameter and corresponding types of values for the parameter in accordance with an illustrative embodiment;

DETAILED DESCRIPTION

Figure 1:
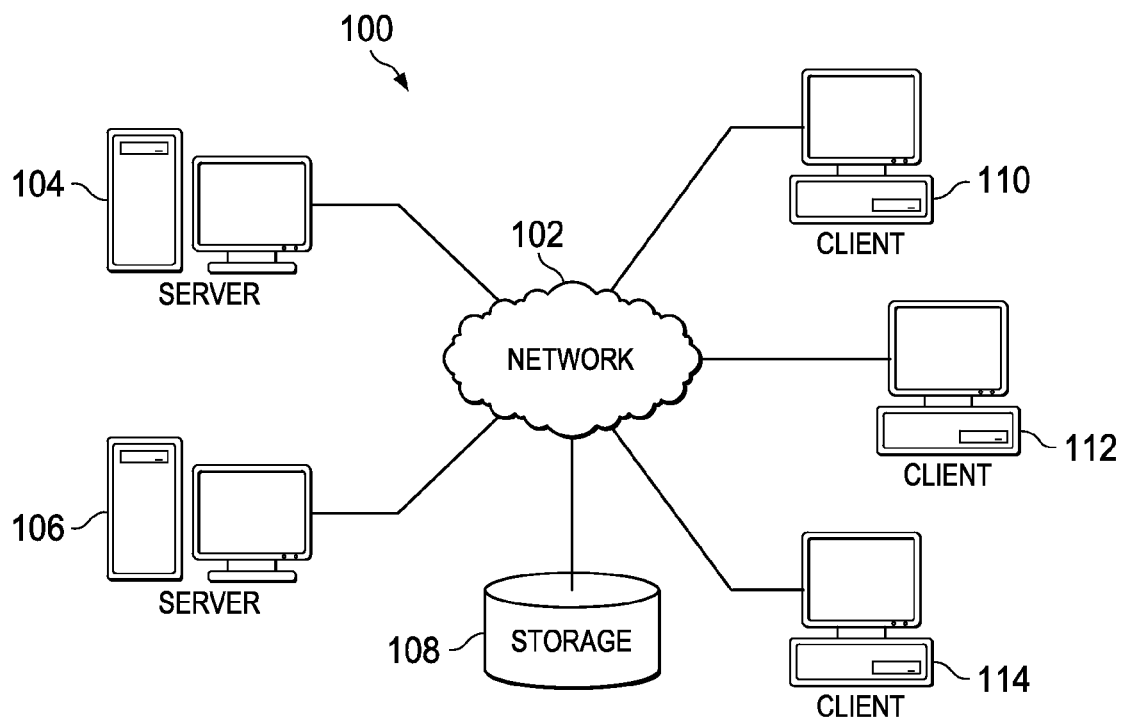
FIG. 1 is an illustration of a data processing environment in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product comprising computer readable program code stored on a computer-readable tangible storage device.

Any combination of one or more computer readable device(s) may be utilized. The computer-readable tangible storage device may be, for example, an electronic, magnetic, optical, electromagnetic, infrared, or semiconductor system, apparatus, or device. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disk read-only memory (CDROM), an optical storage device, or a magnetic storage device.

The computer program can be stored on a fixed or portable computer readable storage media or downloaded from the Internet via a network in which the network includes electrical, optical and/or wireless communication links, routers, switches, etc.

Computer program code for carrying out operations of the present invention may be written in any combination of one or more programming languages, including an object-oriented programming language, such as Java, Smalltalk, C++, or the like, and conventional procedural programming languages, such as the "C" programming language or similar programming languages. The program code may run entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus via a computer readable RAM such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer or other programmable data processing apparatus, via a RAM, to function in a particular manner, such that the instructions stored in the computer readable medium produce an article of manufacture including instruction means which implement the function/act specified in the flowchart and/or block diagram block or blocks.

The computer program instructions may also be loaded and installed onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

With reference now to the figures and, in particular, with reference to FIG. 1, an illustration of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 is an illustration of a network of data processing systems in which illustrative embodiments may be implemented. Network data processing system 100 is a network of computers in which the illustrative embodiments may be implemented. Network data processing system 100 contains network 102, which provides communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, data processing systems, and other devices not shown.

Program code located in network data processing system 100 may be stored on a computer recordable storage device and downloaded to a data processing system or other device for use. For example, program code may be stored on a computer recordable storage device on server computer 104 and downloaded to client computer 110 over network 102 for use on client computer 110. One or more illustrative embodiments may be implemented to manage copies of data on network data processing system 100. In particular, one or more illustrative embodiments may be implemented to reduce the number of copies of data in a manner that reduces time needed to process requests for the data.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a cloud, a local area network (LAN), or a wide area network (WAN). FIG. 1 is intended as an example, and not as an architectural limitation for the different illustrative embodiments.

Figure 2:
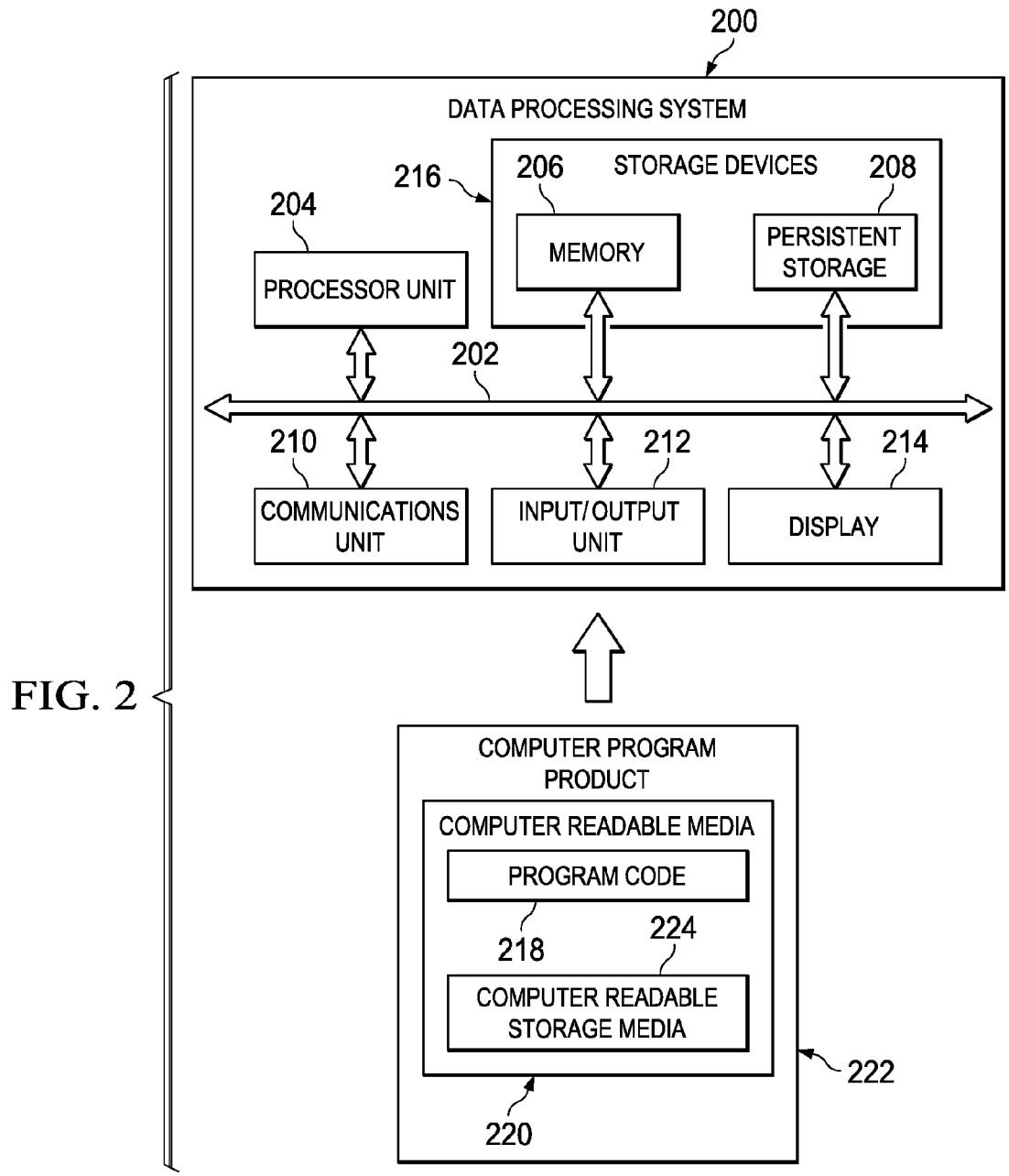
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a central processing unit (CPU), a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware, such as disk storage, that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222 in these examples. In one example, computer readable media 220 may be computer readable storage media 224. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is also referred to as a computer readable storage device.

Alternatively, program code 218 may be transferred to data processing system 200 using communications links, such as wireless communications links, optical fiber cable, coaxial cable, a wire, and/or any other suitable type of communications link. In other words, the communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different illustrative embodiments recognize and take into account a number of different considerations. For example, the different illustrative embodiments recognize and take into account that one manner of validating data may be to incorporate validation processes in web server applications. The different illustrative embodiments recognize and take into account that another solution may involve having another party, other than the application developer, provide security for web server applications. This type of security may take the form of web application firewalls, development tools, intrusion protection systems, and/or other mechanisms. The different illustrative embodiments recognize and take into account that, although these types of security systems may provide increased security, issues are still present with the currently available systems.

For example, the different illustrative embodiments recognize and take into account that intrusion protection devices for web server applications often do not know the intended use of the web server application. Additionally, the designers of these intrusion protection devices often do not know the parameters used in a request that is sent to a web server application. For example, at a network layer, an intrusion protection device cannot determine whether data passed to a given parameter should be allowed to contain hypertext markup language content.

Currently available intrusion protection devices may be customized for particular applications. For example, a customer may perform an evaluation of a web application and submit information about the different applications. In other examples, the vendor or the intrusion protection device may analyze the web server application and provide a customized solution for that particular application.

The different illustrative embodiments recognize and take into account that, although these types of solutions may provide security for particular web server applications, these types of solutions may be time consuming and expensive. Additionally, web applications are often dynamic in nature. Changes to the application code for a web application can be made over time. These changes may invalidate the custom enforcement rules created for prior versions of the web application.

Further, the different illustrative embodiments recognize and take into account that it may be desirable to have a process for validating data that can be applied to different applications. A process for validating data that is designed for one application may not work for another application, because the manner in which data is formatted or expected may be different. For example, a process may be designed to recognize specific parameter names. If another application uses different parameter names, that process will not work correctly for the other application.

Therefore, the different illustrative embodiments provide a method and apparatus for validating data contained in a request sent by a requestor to a server application. A computer receives the request from the requestor before receipt of the request by the server application. The computer identifies a set of data validation rules to apply to the data in the request based on a data format specification contained in the request sent by the requestor. The computer determines whether the data is valid based on the identified set of data validation rules. The computer forwards the request to the server application in response to the computer determining that the data is valid based on the identified set of data validation rules.

Figure 3:
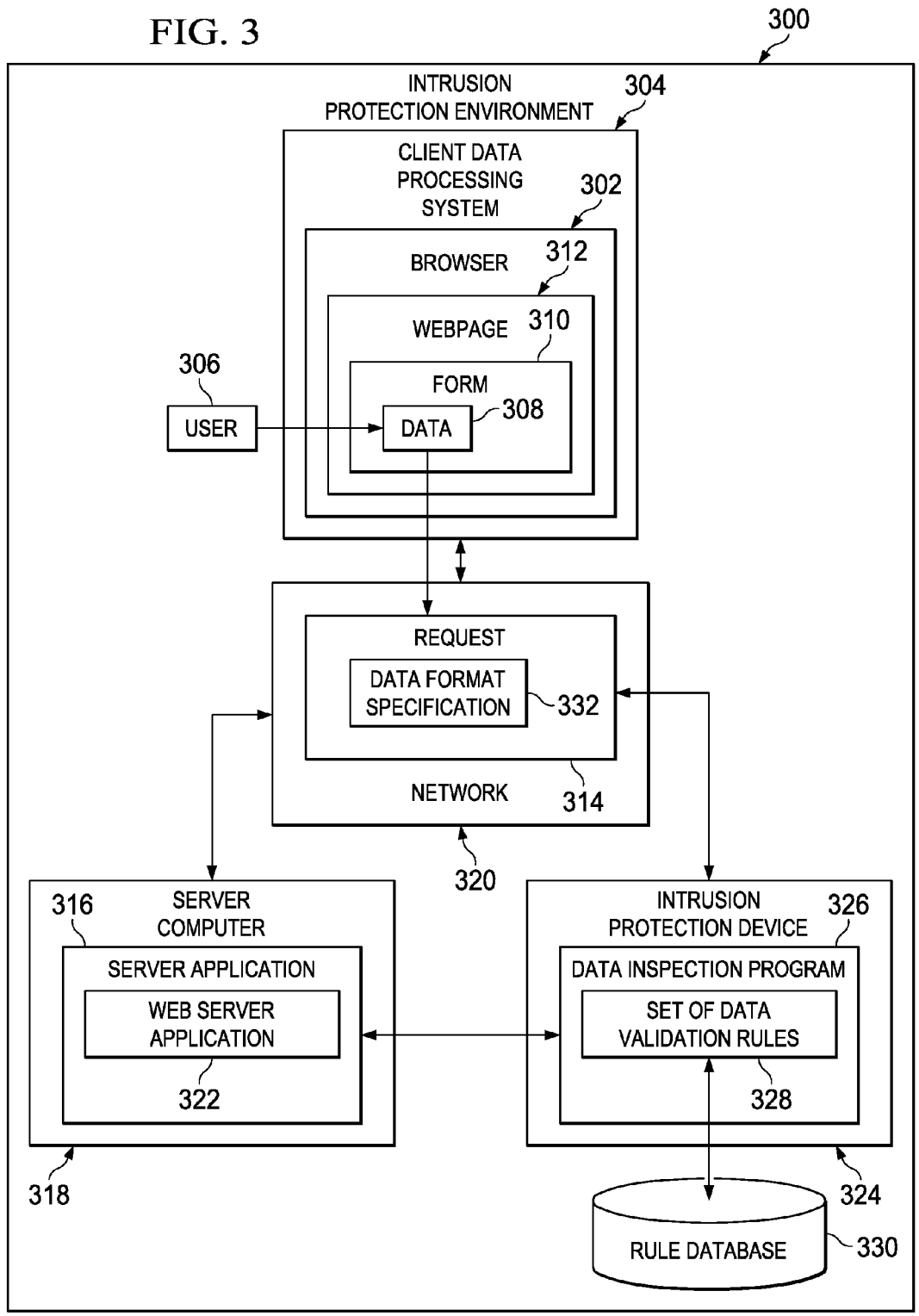
FIG. 3 is an illustration of an intrusion protection environment in accordance with an illustrative embodiment.

With reference now to FIG. 3, an illustration of an intrusion protection environment is depicted in accordance with an illustrative embodiment. Intrusion protection environment 300 is an example of an environment that may be implemented in network data processing system 100 in FIG. 1.

In this illustrative example, browser 302 executes on client data processing system 304. Client data processing system 304 may be implemented using data processing system 200 in FIG. 2. Client data processing system 304 may take a number of different forms. For example, without limitation, client data processing system 304 may be a desktop computer, a laptop computer, a mobile phone, or some other type of data processing system. In this illustrative example, user 306 may enter data into browser 302. In particular, data 308 may be entered into form 310 on webpage 312.

In these illustrative examples, data 308 entered in form 310 may be sent in request 314 to server application 316 running on server computer 318 over network 320. Server application 316 is program code that is configured to process requests from requestors. These requests may be for information or to perform operations. These operations may include, for example, a sales transaction, storing files, deleting files, modifying files, and/or other suitable operations.

In these depicted examples, server application 316 takes the form of web server application 322. Web server application 322 is a server application that is configured to provide access to websites. For example, web server application 322 may send web pages to client data processing system 304 and receive requests from client data processing system 304.

In these illustrative examples, when data 308 is sent to server application 316, intrusion protection device 324 receives request 314 with data 308 prior to server application 316 in server computer 318 receiving request 314. Intrusion protection device 324 may be, for example, a firewall computer, a network gateway computer, and/or some other suitable type of intrusion protection device. As a firewall, intrusion protection device 324 is interposed between client data processing system 304 and server computer 318.

In these examples, request 314 may include other components in addition to data 308, such as, for example, without limitation, routing information, metadata, and/or other suitable types of information. Intrusion protection device 324 processes request 314 before determining whether to forward request 314 with data 308 to web server application 322 for further processing.

In these illustrative examples, data inspection program 326 runs on intrusion protection device 324. Data inspection program 326 may be implemented in hardware, software, or a combination of the two for intrusion protection device 324. In other words, intrusion protection device 324 may be a hardware device, such as a router, a server computer, or some other type of hardware. Additionally, intrusion protection device 324 also may take the form of a software process running on a data processing system. In some cases, intrusion protection device 324 may be a combination of software and hardware that implements data inspection program 326.

In these illustrative examples, intrusion protection device 324 identifies set of data validation rules 328 to apply to data 308 from rule database 330. Data inspection program 326 running on intrusion protection device 324 identifies set of data validation rules 328 using data format specification 332 contained in request 314. Data format specification 332 may take a number of different forms. For example, data format specification 332 may be a particular format or part of a name for a parameter.

As one illustrative example, a parameter for the first name of a person has the name "alphabetic_8_first_name". Data format specification 332 for this parameter is "alphabetic_8", which is part of the name. In this illustrative example, data inspection program 326 identifies set of data validation rules 328 using "alphabetic_8" and rule database 330. For example, data inspection program 326 may compare "alphabetic" and "8" to rule database 330 to identify set of data validation rules 328. In this example, set of data validation rules 328 for this parameter specifies that the data value for the first name of the person should be eight or fewer alphabetic characters.

As another example, the name of the parameter indicates a type for the parameter and/or a use for the parameter. For example, a parameter may have the name "date_reservation". In this example, data format specification 332 is the "date" portion of this name and indicates that the parameter has a date type. In some illustrative examples, data inspection program 326 may identify set of data validation rules 328 from rule database 330 that correspond to a data type. More specifically, data inspection program 326 correlates information in rule database 330 to data format specification 332 to identify set of data validation rules 328.

In other illustrative examples, data format specification 332 may be, for example, metadata or other data included in request 314 that identifies set of data validation rules 328 for use in processing data 308. In these illustrative examples, data inspection program 326 may apply set of data validation rules 328 to data 308 for different types of applications.

In these illustrative examples, programmer 334 determines what data format specification 332 will be for a particular parameter. In some situations, an unauthorized person, such as a hacker, for example, may try to change data format specification 332. If data inspection program 326 receives request 314 with an altered data format specification, data inspection program 326 does not recognize the altered data format specification and does not forward request 314 to server application 316. Further, data inspection program 326 is unable to correlate information in rule database 330 to an altered data format specification. In this manner, when data format specification 332 is altered from a correct data format specification for a parameter, data inspection program 326 is unable to use data format specification 332 to identify set of data validation rules 328.

In response to identifying set of data validation rules 328, data inspection program 326 applies set of data validation rules 328 to data 308 to determine whether data 308 in request 314 should be forwarded to server application 316. In other words, data inspection program 326 determines whether data 308 is valid based on set of data validation rules 328. If, after applying set of data validation rules 328, data inspection program 326 determines that data 308 is valid based on set of data validation rules 328; data inspection program 326 then forwards data 308 to server application 316. If data inspection program 326 determines that data 308 is not valid based on set of data validation rules 328, data inspection program 326 blocks data 308 from being forwarded to server application 316. Additionally, data inspection program 326 may perform a number of other operations. For example, data inspection program 326 may generate an entry in a log regarding the failure of data 308 to meet set of data validation rules 328, generate an alert, and/or perform other suitable types of operations.

In an alternate embodiment, development of server application 316 may include the use of data inspection program 326 in intrusion protection device 324. For example, data inspection program 326 may identify set of data validation rules 328 from rule database 330 as a set of data validation rules that is desirable for use in writing server application 316. As programmer 334 writes server application 316, intrusion protection device 324 does not pass to server application 316 requests with nonconforming data format from other applications used by browser 302 that do not meet set of data validation rules 328. As a result, when data 308 does not reach server application 316 as expected, programmer 334 may review or debug server application 316 such that the generation of data 308 generated by forms, scripts, applets, or other code controlled by server application 316 meets set of data validation rules 328.

Thus, the different illustrative embodiments provide a capability to have increased intrusion protection with respect to data being sent to a server application. The different illustrative embodiments include a data format specification within the data. The data format specification may be included as part of the data or associated with the data. In the different examples, the data format specification is used to identify rules for use in determining whether the data should be forwarded to the server application.

In this manner, data inspection program 326 in intrusion protection device 324 does not have to guess or perform an analysis on the data to identify data validation rules to apply to the data. Further, in this manner, data inspection program 326 does not have to be written for a particular application.

Instead, the different illustrative embodiments provide flexibility to process data 308 for many different types of applications that may have data in different types of formats or with different naming conventions for parameters. Data format specification 332 provides the flexibility to identify set of data validation rules 328 based on the data being sent.

The illustration of intrusion protection environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative examples, intrusion protection device 324 may be located in server computer 318, rather than being a separate hardware component. Further, additional server applications in addition to server application 316 may receive data that is processed by data inspection program 326 in intrusion protection device 324.

Figure 4:
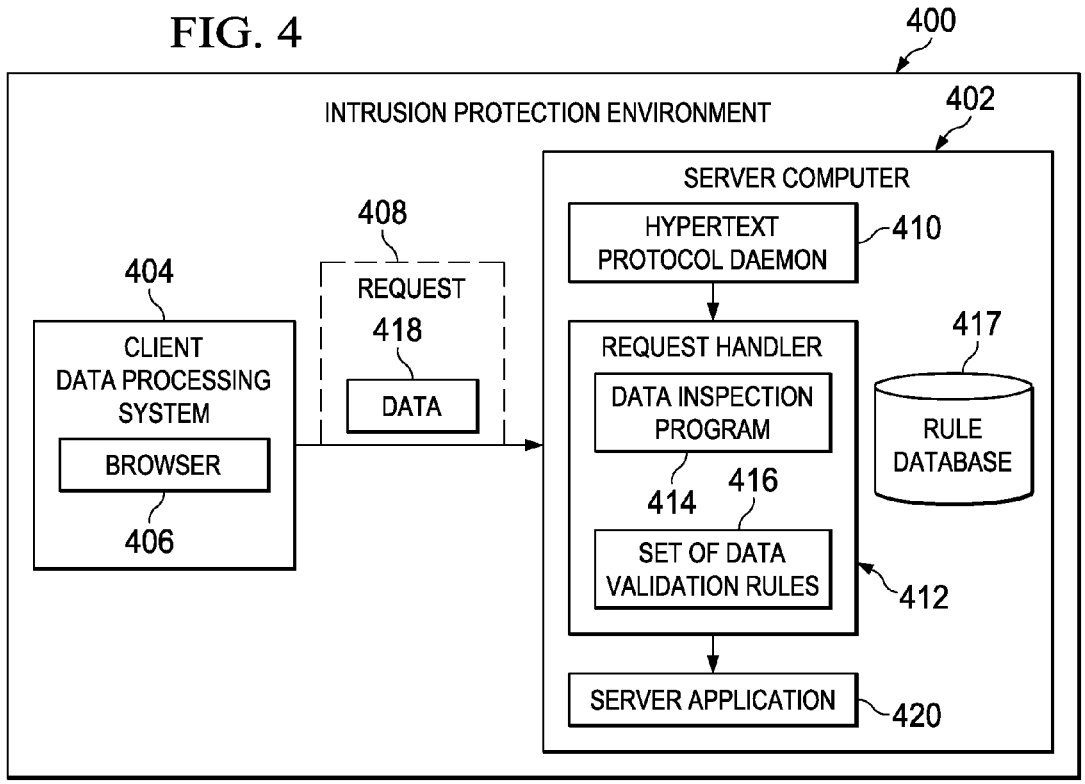
FIG. 4 is an illustration of another implementation for an intrusion protection environment in accordance with an illustrative embodiment.

With reference now to FIG. 4, an illustration of another implementation for an intrusion protection environment is depicted in accordance with an illustrative embodiment. In this example, intrusion protection environment 400 may be implemented using network data processing system 100 in FIG. 1. This configuration of intrusion protection environment 400 may also be used for developing server applications in addition to protecting server applications from intrusions.

In this illustrative example, intrusion protection environment 400 includes server computer 402 and client data processing system 404. Client data processing system 404 has browser 406, which may send request 408 to hypertext protocol daemon 410. Request 408 is a hypertext protocol request in this example.

Hypertext protocol daemon 410 is a process that runs on server computer 402 in these examples. Hypertext protocol daemon 410 is configured to receive hypertext protocol requests, such as request 408. In this example, hypertext protocol daemon 410 calls request handler 412 to process request 408.

In these illustrative examples, request handler 412 includes data inspection program 414. Data inspection program 414 identifies set of data validation rules 416 from rule database 417 for use in processing data 418 in request 408. If data inspection program 414 determines that data 418 should be sent to server application 420 running on server computer 402, request handler 412 sends data 418 to server application 420. If data inspection program 414 determines that data 418 is not valid, then request handler 412 does not send data 418 to server application 420.

Figure 5:
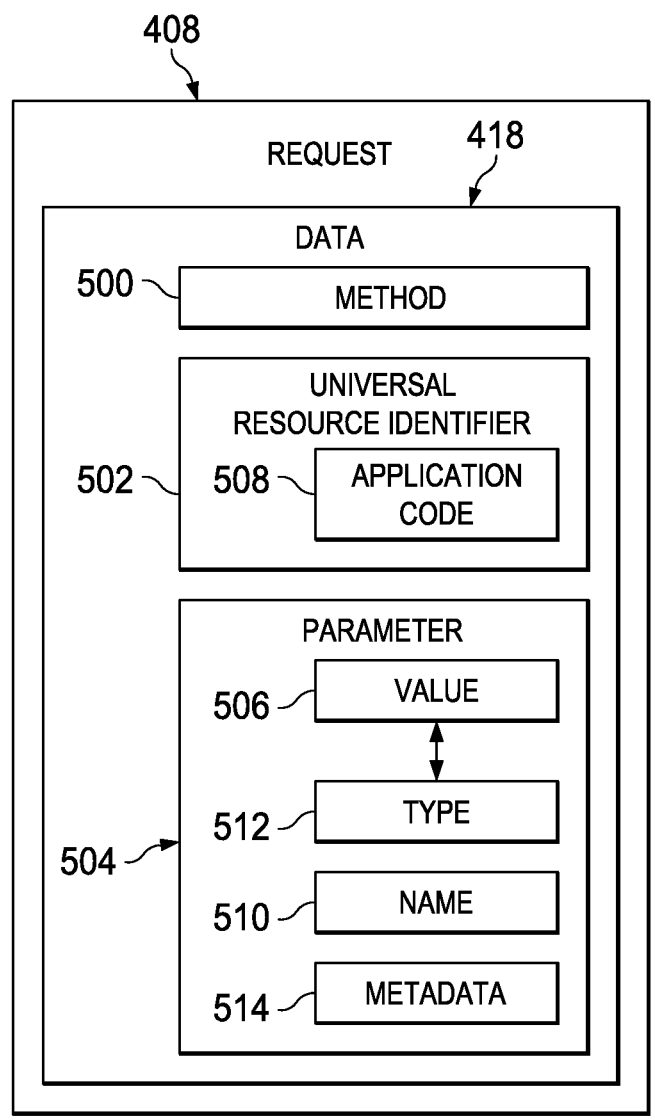
FIG. 5 is an illustration of a request with data in accordance with an illustrative embodiment.

With reference now to FIG. 5, an illustration of a request with data is depicted in accordance with an illustrative embodiment. In this illustrative example, data 418 in request 408 from FIG. 4 comprises method 500, universal resource identifier 502, parameter 504, and value 506. Method 500, in this example, identifies a method to be initiated by request handler 412 in FIG. 4. As depicted, method 500 is a post request. The request handler uses method 500 when a client data processing system, such as client data processing system 404, needs to send data to a server application, such as server application 420 in FIG. 4.

In this illustrative example, universal resource identifier 502 identifies application code 508 within the server application to process request 408. Parameter 504 is the parameter used by the application code, and value 506 is the value for parameter 504.

In these illustrative examples, a data inspection program, such as data inspection program 414 in FIG. 4, applies a set of data validation rules, such as set of data validation rules 416 identified using request 408, to value 506 to determine whether value 506 is a valid value. For example, value 506 may take different forms. For example, without limitation, value 506 may be a character, a string, an alphanumeric string, an integer, or some other type of value.

In these depicted examples, parameter 504 has name 510. Name 510 indicates type 512 of data 418 for parameter 504. In particular, name 510 indicates type 512 of value 506 of parameter 504. Further, name 510 may indicate different types of information for value 506. This information may include, for example, a range of values for value 506 for parameter 504, a length for value 506, a character type for value 506, and/or other suitable information. In this manner, name 510 for parameter 504 includes the data format specification used by the data inspection program to identify the set of data validation rules to apply to value 506.

In one illustrative example, name 510 for parameter 504 may be "int_8_recordidentifier". In this example, the data inspection program uses name 510 to identify the set of data validation rules to apply to value 506 for parameter 504. In particular, the data inspection program uses name 510 to determine that value 506 is for a record identifier, should be a numeric integer, and should have a length that is about eight bytes or less.

In other illustrative examples, metadata 514 may be present within data 418. Metadata 514 may identify the set of data validation rules, include the set of data validation rules, and/or provide other suitable hints to identify the appropriate set of data validation rules to apply to value 506. As one illustrative example, metadata 514 may include a range of values for value 506. Further, metadata 514 may include a header identifying type 512 of value 506.

With reference now to FIG. 6, an illustration of a table of names for a parameter and corresponding types of values for the parameter is depicted in accordance with an illustrative embodiment. In this illustrative example, table 600 includes names 602, types 604, and rules 606. Names 602 are examples of implementations for name 510 in FIG. 5. Types 604 are examples of implementations for type 512 in FIG. 5. Types 604 are for a type of parameter in this depicted example. Rules 606 are examples of implementations for set of data validation rules 416 in FIG. 4 that may be identified using names 602.

As one illustrative example, name 608 is "date_mm/dd/yy". Name 608 indicates that the value for the parameter has a date type. Further, name 608 indicates that the value must be a date having the format mm/dd/yy.

Figure 7:
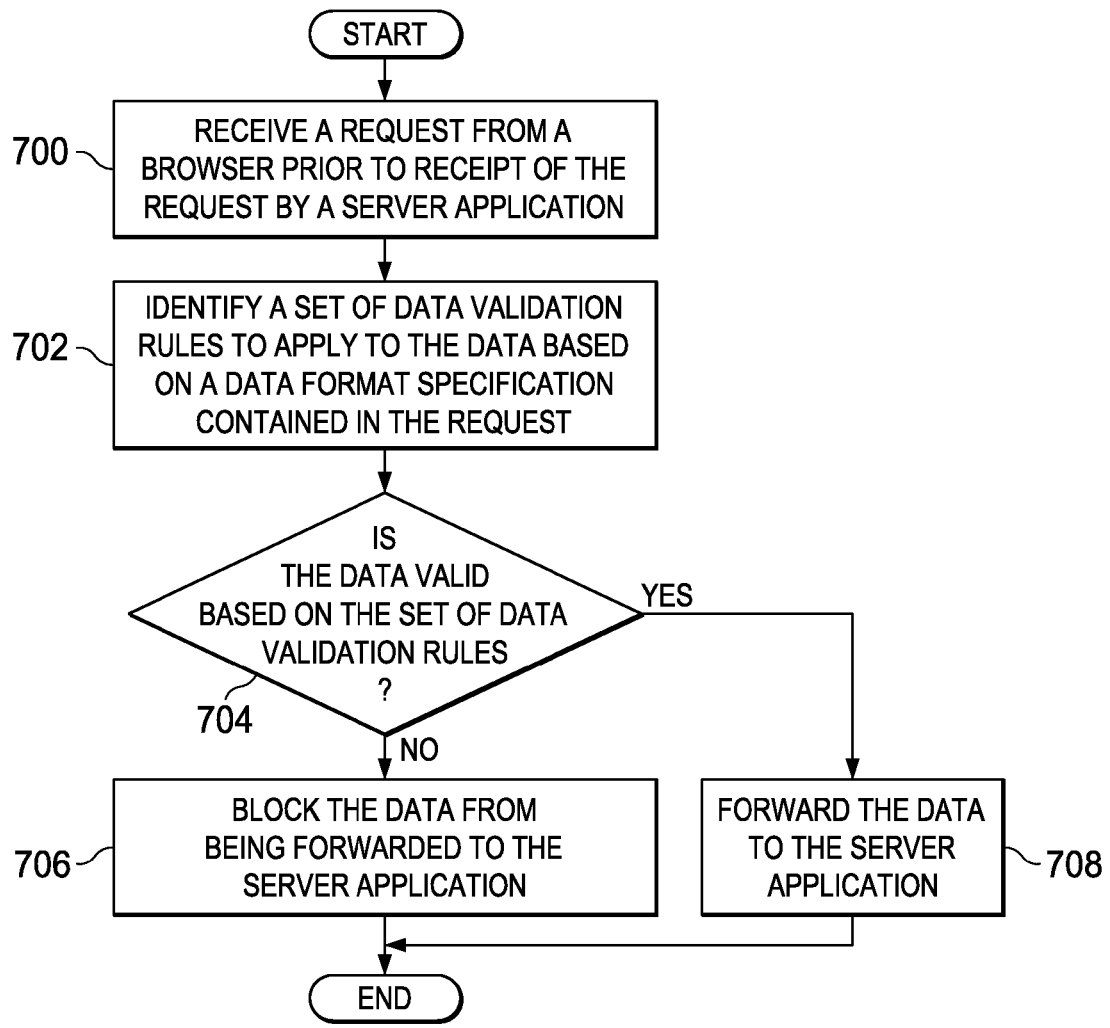
FIG. 7 is an illustration of a flowchart of a process for processing data sent from a requestor in accordance with an illustrative embodiment.

With reference now to FIG. 7, an illustration of a flowchart of a process for processing data sent from a requestor is depicted in accordance with an illustrative embodiment. The process illustrated in FIG. 7 may be implemented in intrusion protection environment 300 in FIG. 3.

The process begins by data inspection program 326 in intrusion protection environment 300 receiving request 314 from browser 302 before receipt of request 314 by server application 316 (step 700). Request 314 is for server application 316. Browser 302 runs on client data processing system 304 in this example. Server application 316 runs on server computer 318. In these examples, data inspection program 326 runs on intrusion protection device 324. Intrusion protection device 324 is in communication with client data processing system 304 and server computer 318.

Data inspection program 326 identifies set of data validation rules 328 to apply to data 308 in request 314 based on data format specification 332 contained in request 314 sent by browser 302 (step 702). In step 702, data format specification 332 may be the name or part of the name of a parameter for data 308. The name may indicate valid types of characters for data 308, a type of data for data 308, a set of data validation rules to apply to data 308, and/or other suitable information.

Data inspection program 326 then determines whether data 308 is valid based on the identified set of data validation rules 328 (step 704). For example, the rules can specify a length of data, a type of data, and/or other types of rules. The type of data may include, for example, without limitation, alphabetic characters, numeric characters, symbols, and/or other suitable types of characters. If data inspection program 326 determines that data 308 is not valid based on set of data validation rules 328, data inspection program 326 blocks data 308 from being forwarded to server application 316 (step 706), with the process terminating thereafter.

With reference again to step 704, if data inspection program 326 determines that data 308 is valid based on set of data validation rules 328, data inspection program 326 forwards data 308 to server application 316 (step 708), with the process terminating thereafter.

Figure 8:
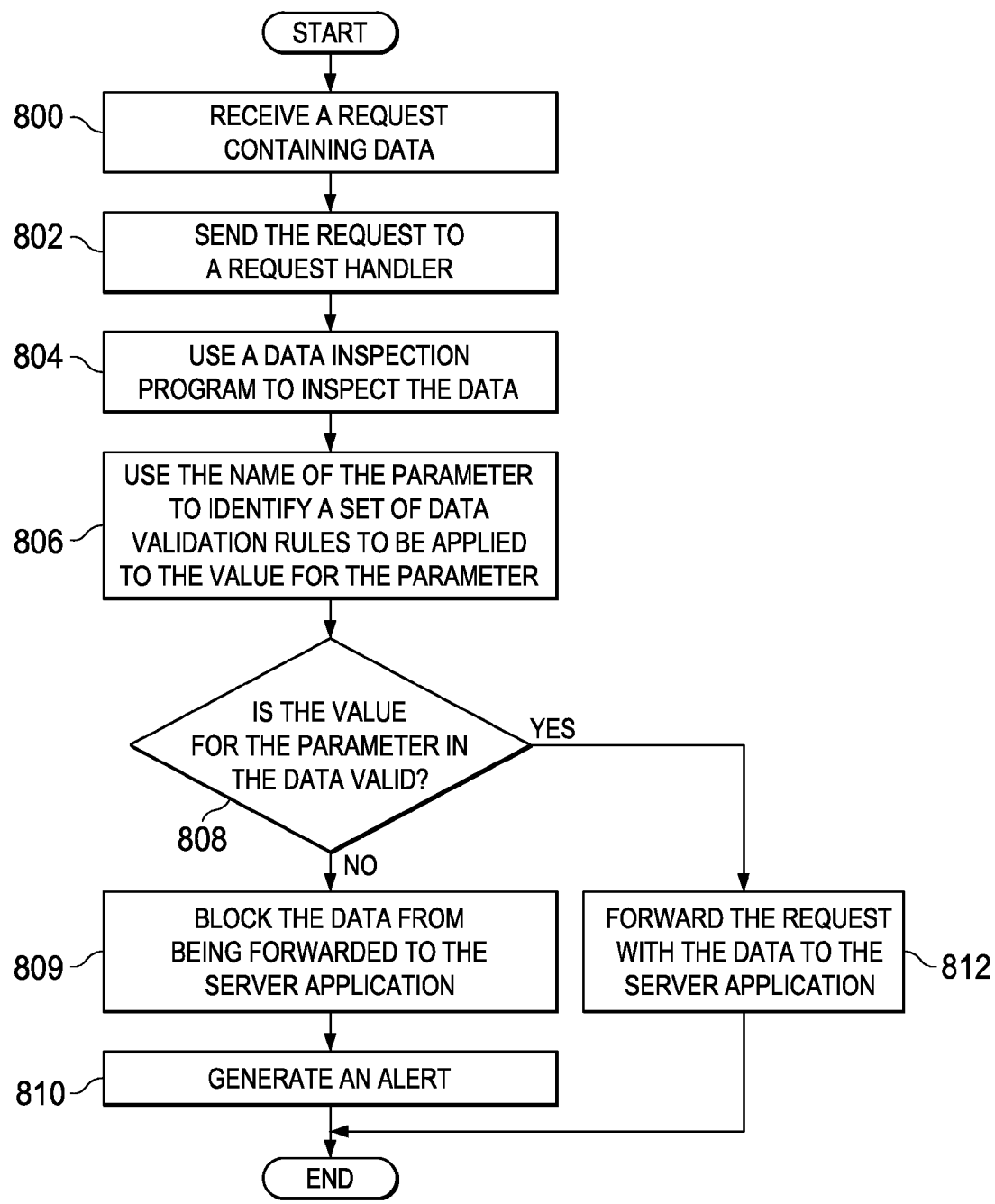
FIG. 8 is an illustration of a flowchart of a process for processing data in a request in accordance with an illustrative embodiment.

With reference now to FIG. 8, an illustration of a flowchart of a process for processing data in a request is depicted in accordance with an illustrative embodiment. The process illustrated in FIG. 8 may be implemented in intrusion protection environment 400 in FIG. 4.

The process begins by hypertext protocol daemon 410 receiving request 408 containing data 418 (step 800). Request 408 may be received from, for example, browser 406 in FIG. 4. In this illustrative example, at least a portion of data 418 is data that may have been entered into a form in browser 406. Further, data 418 includes a value for a parameter. Data 418 also includes the name of the parameter.

Hypertext protocol daemon 410 sends request 408 to request handler 412 (step 802). Request handler 412 uses data inspection program 414 to inspect data 418 (step 804). Data inspection program 414 uses the name of the parameter to identify set of data validation rules 416 to be applied to the value for the parameter (step 806). Thereafter, data inspection program 414 uses set of data validation rules 416 identified to determine whether the value for the parameter in data 418 is valid (step 808).

In this illustrative example, if the value for the parameter in data 418 does not meet the set of data validation rules identified, the value for the parameter in data 418 is not valid. The request may not be forwarded if the value for the parameter included in data 418 is not valid.

With reference again to step 808, if data inspection program 414 determines that the value for the parameter in data 418 is not valid, the program blocks data 418 from being forwarded to server application 420 (step 809). Thereafter, data inspection program 414 generates an alert (step 810), with the process terminating thereafter. In some illustrative examples, this alert may be sent back to browser 406 for display to the user, the server operator, security operations personnel, and/or any other interested party.

With reference again to step 808, if data inspection program 414 determines that the value for the parameter in data 418 is valid, the process forwards request 408 with data 418 to server application 420 (step 812), with the process terminating thereafter.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

Thus, the different illustrative embodiments provide a method and apparatus for processing data sent by a requestor to a web server application. In one illustrative example, a CPU receives data from a requestor for a server application. The CPU identifies a set of data validation rules to apply to the data based on a data format specification in the data sent by the requestor. The CPU determines whether to forward the data to the server application using the data and the set of data validation rules identified to apply to the data. The CPU forwards the data to the server application in response to a determination that the data should be forwarded to the server application.

The terminology used herein is for the purpose of describing particular embodiments only, and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer readable medium providing program code for use by, or in connection with, a computer or any instruction system.

The computer readable storage device can be an electronic, magnetic, optical, electromagnetic, infrared, or semiconductor system (or apparatus or device). Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories, which provide temporary storage of at least some program code in order to reduce the number of times code must be retrieved from bulk storage during running of the code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening networks. Modems, cable modem, and Ethernet cards are just a few of the currently available types of network adapters.

What is claimed is:

1. A method for validating data contained in a request sent by a requestor to a server application, the method comprising the steps of:
   receiving, by one or more processors, the request from the requestor before processing of the request by the server application;
   identifying, by one or more processors, a set of data validation rules to apply to the data in the request based on a data format specification contained in the request sent by the requestor;
   determining, by one or more processors, that the data is valid based on the identified set of data validation rules, and in response, forwarding the request to the server application for processing.

2. The method of claim 1, further comprising:
   determining, by one or more processors, that the data is not valid based on the identified set of data validation rules, and in response, one or more processors blocking the request from being forwarded to the server application.

3. The method of claim 1, wherein the data format specification is part of a name for a parameter for the data and specifies valid types of characters for the data.

4. The method of claim 1, wherein the data format specification is part of a name for a parameter for the data and indicates a type of data for the parameter.

5. The method of claim 1, further comprising:
   correlating, by one or more processors, the data format specification to the identified set of data validation rules to apply to the data.

6. The method of claim 1, wherein one or more processors act as a firewall.

7. The method of claim 6, wherein the firewall is interposed between a requesting computer used by the requestor and a server in which the server application is installed.

8. A computer system for validating data contained in a request sent by a requestor to a server application, the computer system comprising:
   one or more processors, one or more computer-readable tangible storage devices, and one or more computer-readable memories;
   first program instructions to receive the request from the requestor before processing of the request by the server application;
   second program instructions to identify a set of data validation rules to apply to the data in the request based on a data format specification contained in the request sent by the requestor;
   third program instructions to determine that the data is valid based on the identified set of data validation rules, and in response, forwarding the request to the server application for processing, wherein the first, the second, and the third program instructions are stored on at least one of the one or more computer-readable tangible storage devices for execution via at least one of the one or more processors via at least one of the computer-readable memories.

9. The computer system of claim 8 further comprising:
   fourth program instructions to block the request from being forwarded to the server application in response to a determination that the data is not valid based on the identified set of data validation rules, wherein the fourth program instructions are stored on at least one of the one or more computer-readable tangible storage devices for execution via at least one of the one or more processors via at least one of the computer-readable memories.

10. The computer system of claim 8, wherein the data format specification is part of a name for a parameter for the data and specifies valid types of characters for the data.

11. The computer system of claim 8, wherein the data format specification is part of a name for a parameter for the data and indicates a type of data for the parameter.

12. The computer system of claim 8 further comprising:
fourth program instructions to correlate the data format specification to the identified set of data validation rules to apply to the data, wherein the fourth program instructions are stored on at least one of the one or more computer-readable tangible storage devices for execution via at least one of the one or more processors via at least one of the computer-readable memories.

13. The computer system of claim 8, wherein the one or more processors is located in a firewall.

14. The computer system of claim 13, wherein the firewall is interposed between a requesting computer used by the requestor and a server in which the server application is installed.

15. A computer program product for validating data contained in a request sent by a requestor to a server application, the computer program product comprising:
one or more computer-readable tangible storage devices and program instructions stored on at least one of the computer-readable tangible storage devices the program instructions comprising:
program instructions to receive the request from the requestor before processing of the request by the server application;
program instructions to identify a set of data validation rules to apply to the data in the request based on a data format specification contained in the request sent by the requestor;
program instructions to determine that the data is valid based on the identified set of data validation rules, and in response, forwarding the request to the server application for processing.

16. The computer program product of claim 15 further comprising program instructions, stored on at least one of the one or more computer-readable tangible storage devices, to block the request from being forwarded to the server application in response to a determination that the data is not valid based on the identified set of data validation rules.

17. The computer program product of claim 15, wherein the data format specification is part of a name for a parameter for the data and specifies valid types of characters for the data.

18. The computer program product of claim 15, wherein the data format specification is part of a name for a parameter for the data and indicates a type of data for the parameter.

19. The computer program product of claim 15 further comprising program instructions, stored on at least one of the one or more computer-readable tangible storage devices, to correlate the data format specification to the identified set of data validation rules to apply to the data.

20. The computer program product of claim 15, wherein one or more processors located in a firewall execute the program instructions stored on at least one of the computer-readable tangible storage devices, and wherein the firewall is interposed between a requesting computer used by the requestor and a server in which the server application is installed.

* * * * *